United States Patent
Roed

(10) Patent No.: US 7,997,074 B2
(45) Date of Patent: Aug. 16, 2011

(54) HYDRAULIC STATION AND METHOD FOR CONTROLLING PRESSURE IN A HYDRAULIC SYSTEM OF A WIND TURBINE

(75) Inventor: Carsten Roed, Bjerringbro (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/832,384

(22) Filed: Jul. 8, 2010

(65) Prior Publication Data

US 2011/0008166 A1    Jan. 13, 2011

Related U.S. Application Data

(60) Provisional application No. 61/225,231, filed on Jul. 14, 2009.

(30) Foreign Application Priority Data

Jul. 10, 2009  (DK) .................................. 2009 70058

(51) Int. Cl.
*F16D 31/02* (2006.01)
*F04B 49/035* (2006.01)
*F04B 49/20* (2006.01)

(52) U.S. Cl. ......................................... 60/430; 417/488

(58) Field of Classification Search ................... 417/288; 60/454, 430
See application file for complete search history.

(56) References Cited

U.S. PATENT DOCUMENTS

| 2,612,838 | A | * | 10/1952 | Nichols .......................... 417/288 |
| 4,027,595 | A | * | 6/1977 | Frank et al. ..................... 60/454 |
| 5,648,644 | A |  | 7/1997 | Nagel |
| 5,779,325 | A |  | 7/1998 | Diesel |
| 6,254,197 | B1 |  | 7/2001 | Lading et al. |
| 7,357,462 | B2 |  | 4/2008 | Uphues |
| 2008/0164751 | A1 |  | 7/2008 | Wedekind |
| 2008/0164752 | A1 |  | 7/2008 | Wedekind |

FOREIGN PATENT DOCUMENTS

| DE | 32 04 695 | 8/1983 |
| DE | 10 2004 057 522 | 4/2006 |
| GB | 688170 | 2/1953 |
| GB | 696657 | 9/1953 |
| GB | 868419 | 5/1961 |
| WO | 98/23474 | 6/1998 |
| WO | 03/080414 | 10/2003 |

* cited by examiner

*Primary Examiner* — Daniel Lopez
(74) *Attorney, Agent, or Firm* — Wood, Herron & Evans, L.L.P.

(57) ABSTRACT

A hydraulic station in a hydraulic system of a wind turbine includes a tank for storing working fluid, first and second pumps fluidly connected to the tank, first and second flow paths extending from the respective first and second pumps to a hydraulic circuit, and first and second relief valves in fluid communication with the respective first and second flow paths. The first pump and first relief valve are controlled based on maintaining pressure of the working fluid in the hydraulic circuit between a first minimum limit and first maximum limit. If the pressure falls below the first minimum limit, the second pump and second relief valve are controlled in addition to the first pump and first relief valve, with the control then based on a second maximum limit and second minimum limit.

11 Claims, 6 Drawing Sheets

| OPERATING MODE | PRIMARY PUMP STARTED | PRIMARY RELIEF VALVE CLOSED | SECONDARY RELIEF VALVE CLOSED | BUILDING PRESSURE |
|---|---|---|---|---|
| PUMP MODE (PRESSURE BUILDING) | TRUE | TRUE | FALSE | TRUE |
| PUMP MODE (IDLING) | FALSE | FALSE | FALSE | FALSE |
| RELIEF MODE (PRESSURE BUILDING) | TRUE | TRUE | FALSE | TRUE |
| RELIEF MODE (IDLING) | TRUE | FALSE | FALSE | FALSE |
| DUAL MODE | TRUE | TRUE | TRUE | TRUE |

HYDRAULIC STATION AND METHOD FOR CONTROLLING PRESSURE IN A HYDRAULIC SYSTEM OF A WIND TURBINE

CROSS-REFERENCE TO RELATED APPLICATIONS

This application claims priority under 35 U.S.C. §119(a) to DK Application No. PA 2009 70058, filed Jul. 10, 2009. This application also claims the benefit of U.S. Provisional Application No. 61/225,231, filed Jul. 14, 2009. Each of these applications is incorporated by reference herein in its entirety.

TECHNICAL FIELD

The present invention relates to a hydraulic system for a wind turbine. More specifically, the present invention relates to a hydraulic station in a hydraulic system of a wind turbine and a method of controlling pressure in the hydraulic system.

BACKGROUND

A wind turbine (also referred to as a "wind turbine generator" or WTG) includes various mechanical systems whose operation is largely dependent upon a pressurized working fluid, namely oil. For example, the brake system of a wind turbine typically includes a disc coupled to a shaft in the drivetrain of the wind turbine and one or more calipers configured to apply friction to the disc via brake pads. The calipers are operated by pressurized working fluid supplied to the brake system. Another example of an oil-consuming system is a hydraulic-based pitch system, which includes one or more hydraulic cylinders for rotating the blades about their respective axes.

Such brake and pitch systems are typically sub-systems of a main hydraulic system in the wind turbine. A hydraulic station in the hydraulic system controls the pressure and temperature of working fluid supplied to the brake and pitch systems. To this end, the hydraulic station typically includes a pump, a filter, and various hydraulic devices.

Designing a hydraulic station can be a challenging task. The station must be designed to not only meet the needs of the brake system, pitch system, and/or other oil-consuming systems associated with the wind turbine's hydraulic system, but also do so in a safe and reliable manner.

SUMMARY

A hydraulic station for a hydraulic system of a wind turbine is disclosed. The hydraulic station includes a unique arrangement of components for controlling the pressure of working fluid supplied to subsystem of the hydraulic system, such as a pitch or brake system. In particular, the hydraulic station includes a tank for storing working fluid, first and second pumps fluidly connected to the tank, first and second flow paths extending from the respective first and second pumps to a hydraulic circuit of the subsystem, and first and second relief valves in fluid communication with the respective first and second flow paths. A control system is configured to control the first pump and first relief valve based on maintaining pressure of the working fluid in the hydraulic circuit between a first minimum limit and first maximum limit. The control system is also configured to control the second pump and second relief valve are controlled in addition to the first pump and first relief valve if the pressure falls below the first minimum limit.

Such an arrangement has the advantage of providing a redundant system. The second pump can serve as a backup or supplementary pump if the first pump fails or cannot meet the demands of the subsystem. This increases the overall reliability of the hydraulic station, allowing the wind turbine to continue to operate in such situations.

In one embodiment, the hydraulic station further includes first and second return lines fluidly connecting the respective first and second flow paths to the tank, and the first and second relief valves are located in the respective first and second return lines. This allows working fluid to be cycled back to the tank when the first and/or second pump is operated with the corresponding relief valve open. As a result, the control system can implement a unique control strategy based on turning the first and second pumps on and off and opening or closing the first and second valves.

To this end, a method of controlling pressure in the hydraulic system with the hydraulic station is also disclosed. The method includes controlling the first pump and first relief valve based on maintaining pressure of the working fluid in the hydraulic circuit between the first minimum limit and first maximum limit, and controlling the second pump and second relief valve in addition to the first pump and first relief valve if the pressure of the working fluid in the hydraulic circuit falls below the first minimum limit. Again, this has the advantage of being a redundant system.

When both pumps are being controlled, the method may comprise operating the first and second pumps while the first and second relief valves are closed to build pressure in the hydraulic circuit, opening the second relief valve if the pressure increases to a second maximum limit, and opening the first relief valve if the pressure increases to the first maximum limit. The second maximum limit is less than the first maximum limit. The method may also involve closing the first and second relief valves if the pressure falls to a second minimum limit, thereby allowing the first and second pumps to re-build pressure in the hydraulic circuit. The second minimum limit is less than the first minimum limit. Thus, control may be based on different maximum limits and minimum limits depending on the number of pumps being operated.

The first pump and first relief valve need not always function as the main pump for meeting the demands of the hydraulic circuit. For example, the method may further involve reversing the roles of the first and second pumps and first and second relief valves. This results in the second pump and second relief valve being controlled based on maintaining pressure of the working fluid in the hydraulic circuit between the first minimum limit and first maximum limit, and the first pump and first relief valve being controlled in addition to the second pump and second relief valve if the pressure of the working fluid falls below the first minimum limit.

Reversing the roles in such a manner further increases the overall reliability of the hydraulic system because it distributes the workload more evenly between the first and second pumps. Therefore, the lifetime of the first pump may be increased. In one embodiment, reversing the roles is accomplished by designating the first pump as a primary pump and the second pump as a secondary pump, monitoring the amount of time the first pump is operated, and designating the second pump as the primary pump and the first pump as the secondary pump if the cumulative operation time of the first pump exceeds a predetermined time limit.

The predetermined time limit may be based on the expected lifetime of the first pump. Thus, rather than continuing to operate as the primary pump and experiencing greater wear, the first pump assumes the roles of the secondary pump and is operated less. This prolongs its lifetime and decreases the chances of a failure in the hydraulic system.

These and other embodiments, together with their advantages, will become more apparent based on the description below.

DETAILED DESCRIPTION

Figure 1:
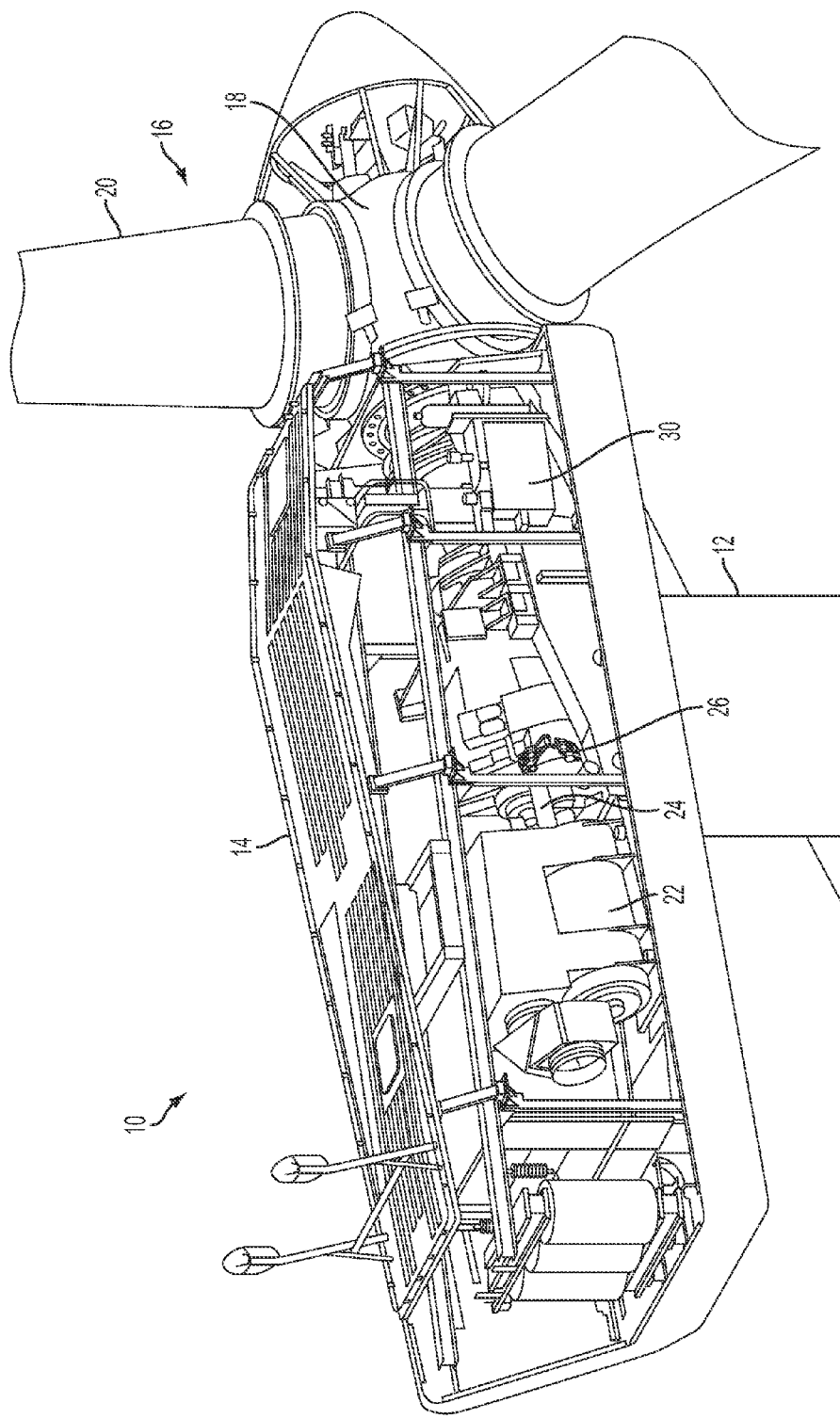
FIG. 1 is a perspective view of an example of a wind turbine, with portions cut-away so that internal components of the wind turbine can be seen.

FIG. 1 shows one embodiment of a wind turbine 10. The wind turbine generally comprises a tower 12, a nacelle 14 supported by the tower 12, and a rotor 16 attached to the nacelle 14. The rotor 16 includes a hub 18 rotatably mounted to the nacelle 14 and a set of blades 20 coupled to the hub 18. The blades 20 convert the kinetic energy of the wind into mechanical energy used to rotate the shaft of a generator 22 via a drivetrain 24, as is conventional.

The wind turbine 10 further includes several hydraulically-based systems that relate to different aspects of its operation. For example, a pitch system (not shown) includes one or more hydraulic cylinders for rotating the blades 20 about their respective axes. Additionally, a brake system 26 includes one or more hydraulically-actuated calipers for applying friction to a disc. The disc is coupled to the drivetrain 24 such that the calipers can bring the rotor 16 to a standstill and/or maintain the wind turbine 10 in a "parked" (i.e., stopped) position when actuated.

Figure 2:
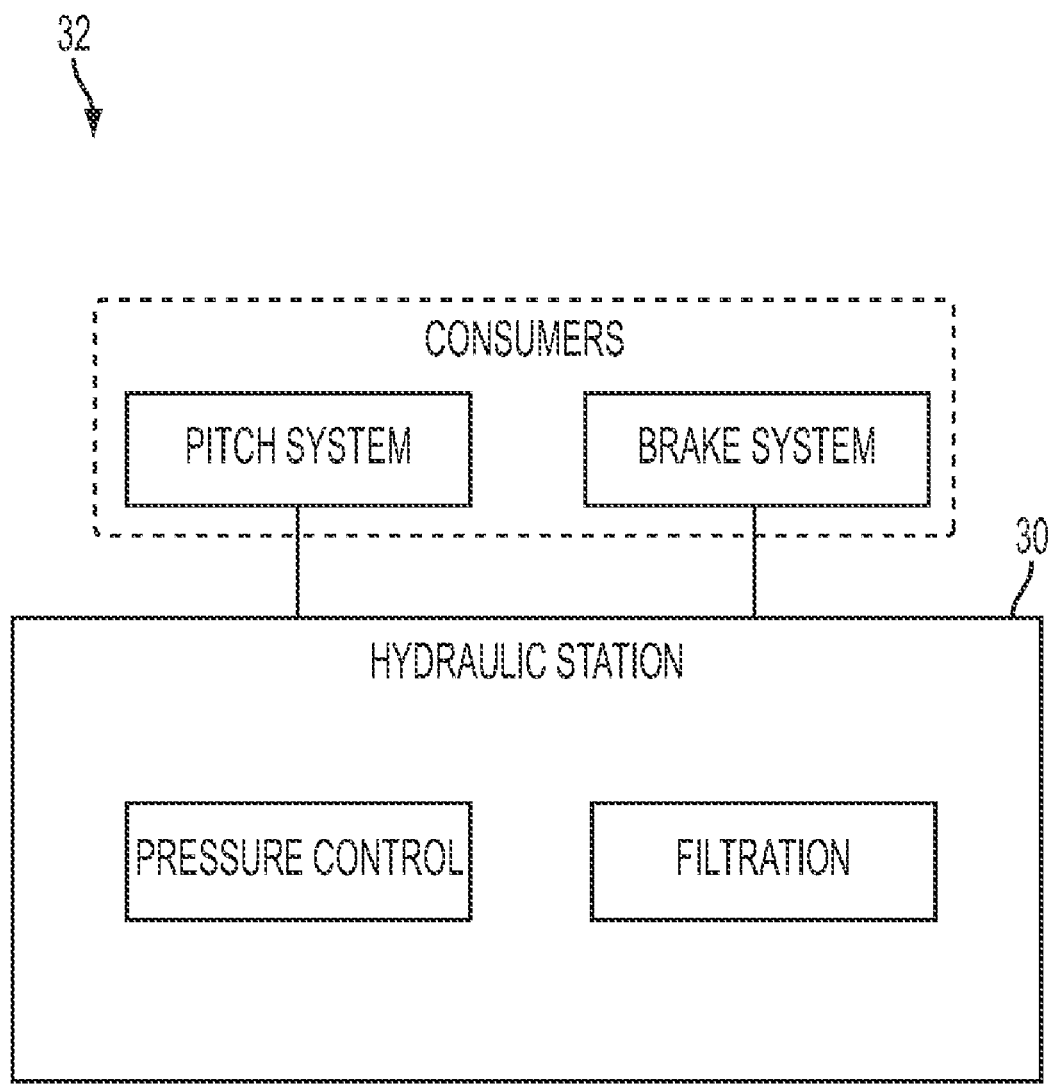
FIG. 2 is a schematic view of a hydraulic system of a wind turbine.

To supply working fluid (e.g., pressurized oil) to these systems, the wind turbine 10 is further provided with a hydraulic station 30. The hydraulic station 30 and hydraulically-based systems it serves are part of a larger hydraulic system 32, as shown schematically in FIG. 2. More specifically, the pitch system and brake system are subsystems within the hydraulic system 32. They are considered "consumer" systems because they place demands on the hydraulic station 30 for the working fluid. To meet these demands, the hydraulic station 30 includes components designed to perform various functions, such as pressure control and filtration, as will be described below.

Figure 3:
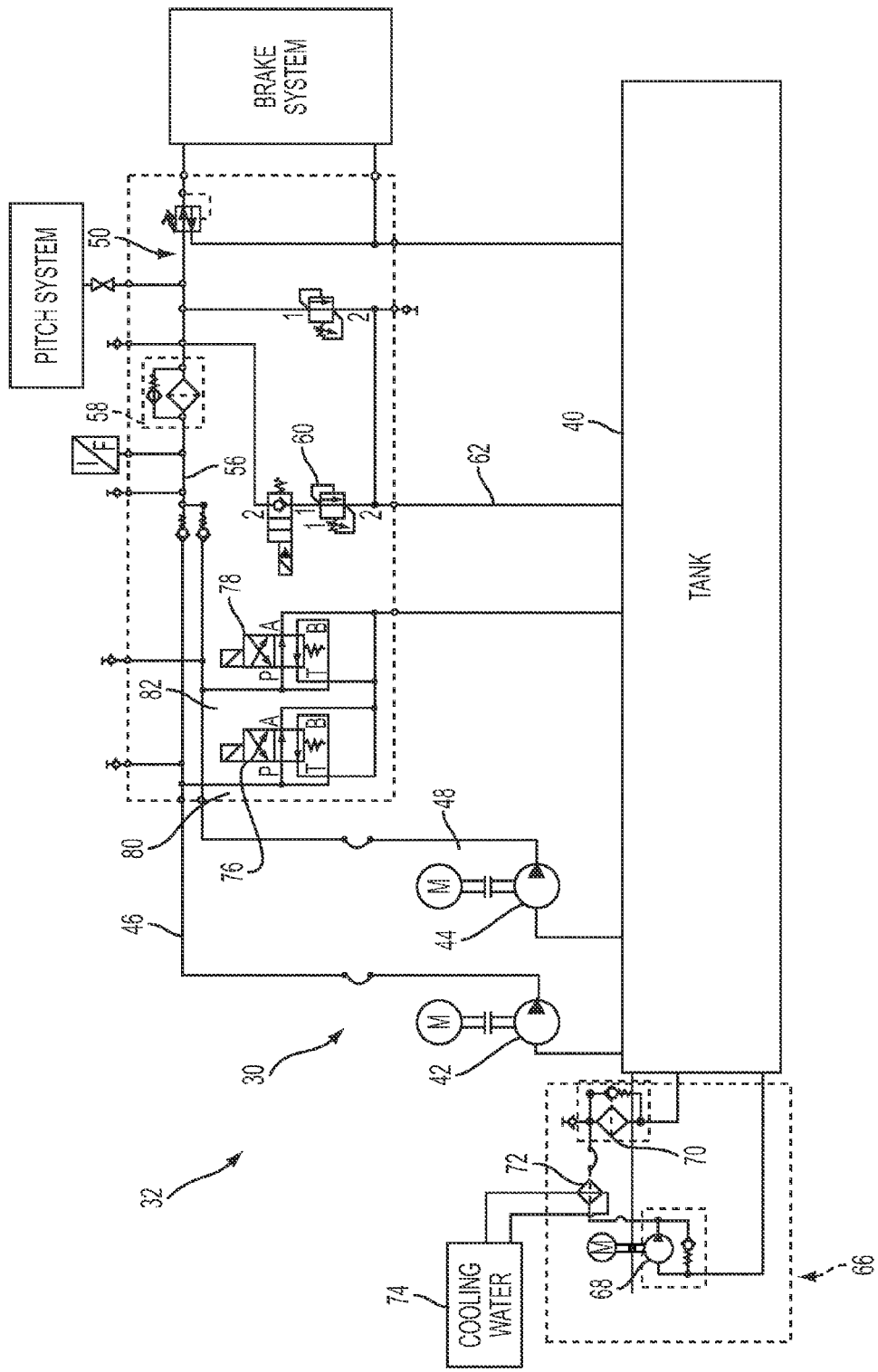
FIG. 3 is a hydraulic diagram of one embodiment of a hydraulic station.
Figure 4:
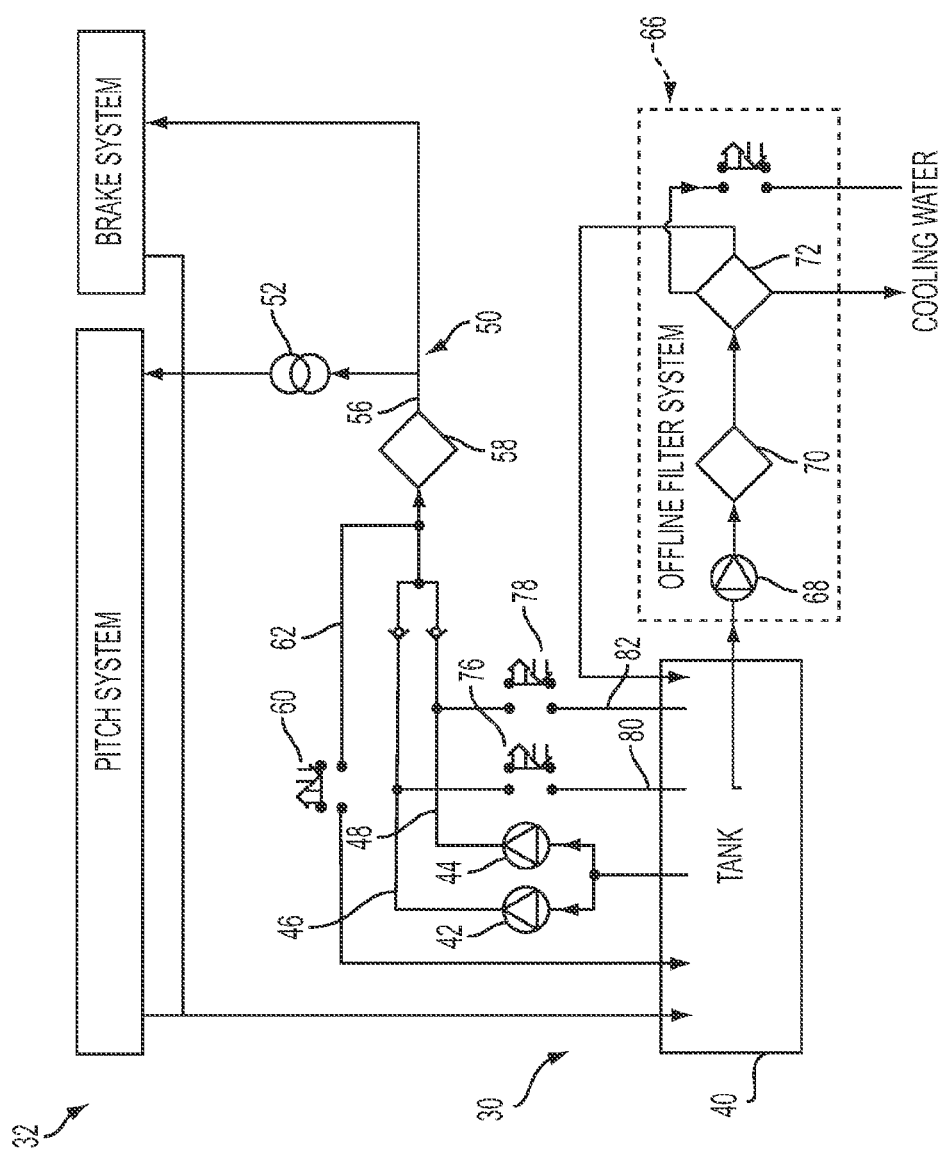
FIG. 4 is a schematic view of the hydraulic station represented in FIG. 3.

Indeed, FIGS. 3 and 4 illustrate one embodiment of the hydraulic station 30 in further detail, with FIG. 3 being a hydraulic diagram and FIG. 4 being a schematic view of the hydraulic diagram. The hydraulic station 30 includes a tank or reservoir 40 for storing the working fluid and first and second pumps 42, 44 fluidly connected to the tank 40. First and second flow paths 46, 48 extend from the respective first and second pumps 42, 44 to a hydraulic circuit 50 that feeds the working fluid to the pitch system and/or brake system. Because components of the pitch system are typically located in the hub 18 (FIG. 1), the working fluid may pass through a rotating transfer 52 (FIG. 4) to reach the pitch system. The present application, however, focuses on supplying the working fluid at the proper conditions (e.g., pressure) rather than how the working fluid is physically transferred in the hydraulic circuit 50 to the pitch system, brake system, or other consumer systems.

Accordingly, various hydraulic components may be associated with the hydraulic circuit 50 for this purpose. For example, the hydraulic circuit 50 may include a main supply line 56 fed by the first and second flow paths 46, 48, a high pressure filter 58 located in the main supply line 56, and a heating valve 60 communicating with the main supply line 56. In the embodiment shown, the heating valve 60 is a relief valve located in a return line 62 that communicates working fluid from the main supply line 56 back to the tank 40. The heating valve 60 creates a pressure drop, and this released energy is used to heat the working fluid.

Advantageously, however, an offline filter system 66 of the hydraulic system 32 remains isolated from the first and second pumps 42, 44, first and second flow paths, and hydraulic circuit 50. The offline filter system 66 is only in fluid communication with the tank 40, which is why it is considered an "offline". In the offline filter system 66, an offline pump 68 pulls working fluid from the tank 40 and delivers it to a filter 70 fluidly connected to the pump 68. After passing through the filter 70, the working fluid may then pass through a heat exchanger 72 before returning to the tank 40. A supply of cooling water 74 is fluidly connected to the heat exchanger 72 so that the working fluid can be conditioned to a desired temperature.

To control the pressure of the working fluid supplied to the hydraulic circuit 50, the hydraulic station 30 further includes first and second relief valves 76, 78 in fluid communication with the respective first and second flow paths 46, 48. The first and second relief valves 76, 78 are shown as being located in respective first and second return lines 80, 82. The first return line 80 fluidly connects the first flow path 46 to the tank 40, and the second return line 82 fluidly connects the second flow path 48 to the tank 40. Thus, part of the first flow path 46 and the first return line 80 define portions of a first open loop for the working fluid, and part of the second flow path 48 and second return line 82 define portions of a second open loop.

Such an arrangement has the advantages of being a redundant system. However, one of the first or second pumps 42, 44 may serve as a "primary" pump that first attempts to meet the demands of the hydraulic circuit 50, and the other as a "secondary pump" that is activated to help the primary pump when necessary. The first and second relief valves 76, 78 are designated in the same manner as their corresponding pump. Therefore, the operation of the first and second pumps 42, 44 and first and second relief valves 76, 78 depends upon their designation. A control system (not shown) that controls the first pump 42, first relief valve 76, second pump 44, and second relief valve 78 incorporates the necessary logic to carry out this strategy.

In use, the control system switches the hydraulic station 30 between three different modes of operation: a pump mode, a relief mode, and a dual mode. The "pump mode" generally refers to a mode where only the primary pump and primary relief valve are controlled to meet the demands of the hydraulic circuit 50. Operating the primary pump with the primary relief valve closed is intended to build pressure in the hydraulic circuit 50. Conversely, stopping the primary pump and opening the primary relief valve is considered an idling condition intended to relieve pressure. The secondary pump remains inactive (i.e., not operating) and the secondary relief valve remains closed in this mode of operation.

The "dual mode" generally refers to a mode where both the primary and secondary pumps are operated and both the primary and secondary relief valves are closed, thereby building pressure in the hydraulic circuit 50.

Finally, the "relief mode" generally refers to a mode that involves operating at least one of the primary or secondary pumps with its corresponding relief valve being open. For example, the relief mode may include the following conditions: a) operating the primary pump with the primary relief valve open while the secondary pump is inactive and the secondary relief valve is closed; b) operating both the primary and secondary pumps with only the secondary relief valve being open; and c) operating both the primary and secondary pumps with both of the primary and secondary relief valves being open. The first two conditions are intended to build pressure during the relief mode, whereas the last condition is considered idling and intended to relieve pressure.

Figures 5A, 5B:
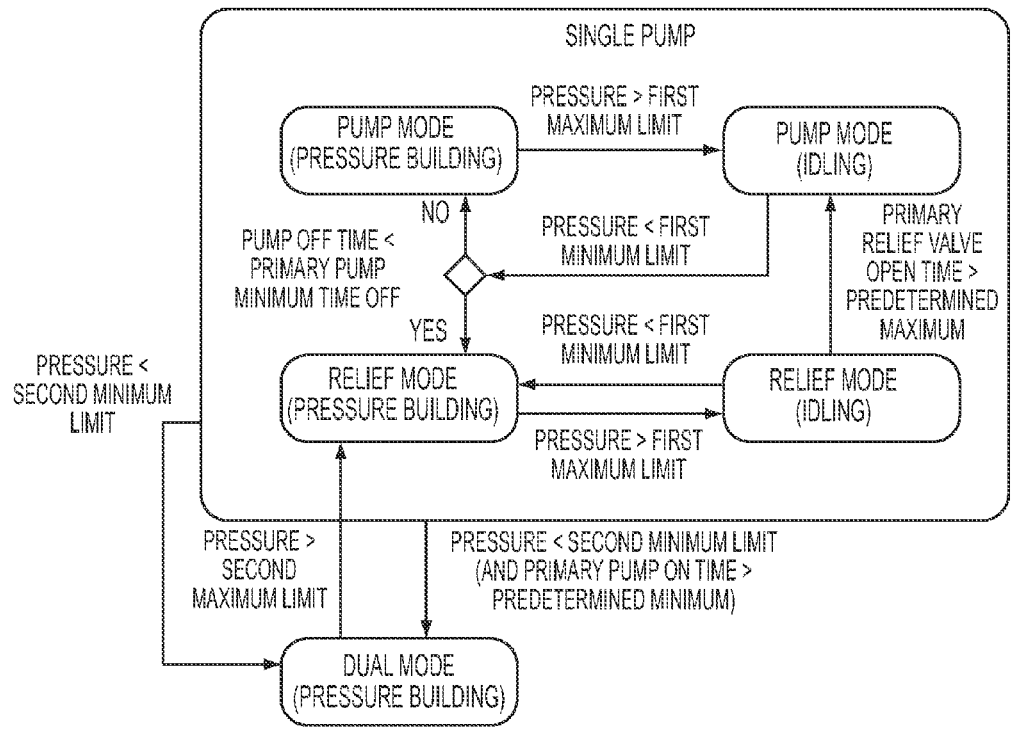
FIGS. 5A and 5B illustrate how the hydraulic station switches between different modes of operation to control the pressure of working fluid in the hydraulic system, with FIG. 5A being a logic diagram and FIG. 5B being a logic table.
Figure 6:
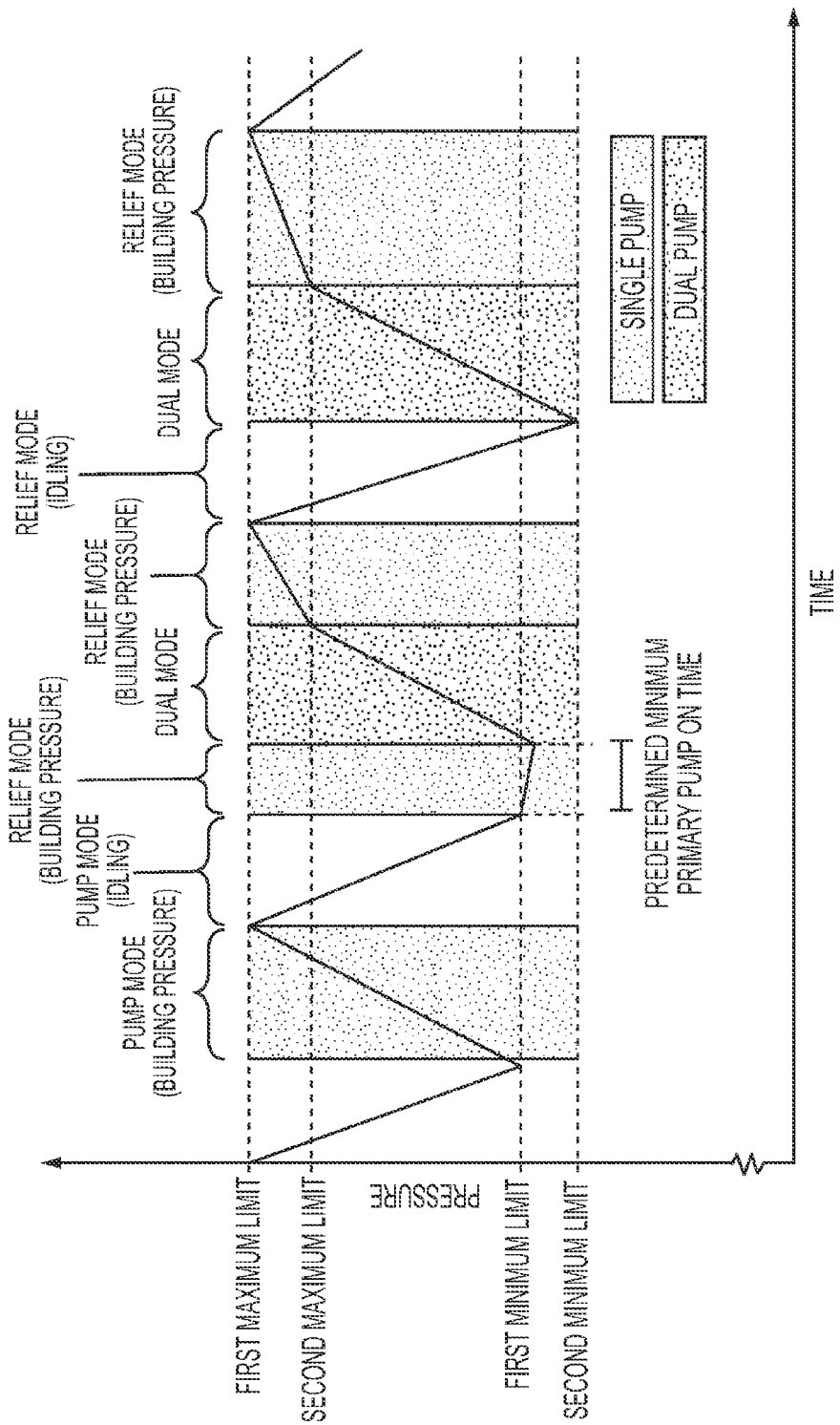
FIG. 6 is a chart illustrating behavior of the working fluid in the hydraulic system during the different modes of operation.

How the control system switches the hydraulic station 30 between the pump mode, dual mode, and relief mode can be better understood with reference to FIGS. 5A, 5B, and 6. Starting with the pressure-building condition of the pump mode, the primary pump is operated with the primary relief valve closed to build pressure in the hydraulic circuit 50. When the pressure increases to first maximum pressure limit, the hydraulic station 30 operates according to the idling condition of the pump mode (the control system stops the primary pump and opens the primary relief valve). The pressure of the working fluid then begins to decrease, as shown in FIG. 6.

Eventually the pressure falls to a first minimum pressure limit. At this point, the control system checks to see if the primary pump has been off less than a predetermined time period (i.e., a predetermined minimum time off). If not, the hydraulic station reverts back to the pressure building condition of the pump mode. The primary pump alone may be able to meet the demands of the hydraulic circuit 50, especially if it takes a relatively long time for the pressure to drop when the primary relief valve is opened. If the primary pump has been off less than the predetermined minimum time off, the control system opens the primary relief valve such that the hydraulic station 30 enters the first relief mode condition described above (where the primary pump is operated while the secondary pump remains inactive). The primary pump may be able to meet the demands of the hydraulic circuit 50 for a limited time period even with the primary relief valve being open, especially if the demands have changed. But if the pressure remains at or below the first minimum limit after a predetermined time period from when the primary pump is re-started (i.e., a predetermined minimum time on), the control system enters the dual mode and operates the secondary pump in addition to the primary pump.

The primary and secondary pumps operate simultaneously during the dual mode with the primary and secondary relief valves being closed to build pressure in the hydraulic circuit 50. If the pressure increases to a second maximum limit, which is set below the first maximum limit, the control system opens the secondary relief valve. Thus, the hydraulic station 30 returns to a relief mode of operation, but this time according to the second relief mode condition described above (where both the primary and secondary pumps are operating and only the secondary relief valve is open). The pressure may continue to build, but typically does so at a slower rate than in the dual mode of operation. If the pressure increases to the first maximum limit, the control system opens the primary relief valve to switch to the idling condition of the relief mode.

At this point, both the primary and secondary relief valves are open such that the pumped working fluid returns to the tank 40 (through the first and second relief lines) instead of building up and maintaining pressure in the hydraulic circuit 50. Thus, the pressure of the working fluid in the hydraulic circuit 50 falls despite the operation of the primary and secondary pumps in the relief mode idling condition. If the pressure falls to a second minimum limit, which is set below the first minimum limit, the hydraulic system 32 reverts back to the dual mode of operation. In other words, the primary and secondary pumps continue to operate but the primary and secondary relief valves are closed.

As can be appreciated, the primary pump is in operation more than the secondary pump in the above-described method of controlling pressure. But either of the first and second pumps 42, 44 may be designated as the primary pump, which means that the designation can be switched. This effectively reverses the roles of the first and second pumps 42, 44 and first and second relief valves 76, 78. For example, if the first pump 42 was designated as the primary pump and the second pump 44 as the secondary pump, the designations may be switched so that the first pump 42 serves as the secondary pump and the second pump 44 serves as the primary pump.

The ability to switch designations can increase the overall reliability of the hydraulic system 32. For example, assuming the first pump 42 is initially designated as the primary pump, the control system may monitor its operation time using a run-time counter or the like. A predetermined time limit based on the expected lifetime of the first pump 42 is programmed into the control system. When the cumulative operation time of the first pump 42 exceeds this predetermined time limit, the control system designates the second pump 44 as the primary pump and first pump 42 as the secondary pump. As a result, the first pump 42 is operated less, which prolongs its lifetime and decreases the chances of a failure in the hydraulic system 32.

In this regard, the wind turbine 10 can continue to operate without having to immediately replace the first pump 42. Instead, service may be scheduled while the first pump 42 assumes the role of the secondary pump in the method described above. The operation time of the first pump 42 may or may not be monitored when it is functioning as the secondary pump. For example, it may be sufficient for the control system to only monitor the amount of time a pump is operating as the primary pump. This may apply to both the first and second pumps 42, 44 (e.g., a runtime counter or the like will begin counting the operation time of the second pump 44 when it assumes the role of the primary pump). Alternatively, the cumulative operation time of both the first and second pumps 42, 44 may be monitored regardless of their designation as the primary or secondary pump.

When the first pump 42 is eventually replaced, the new pump is designated as the primary pump and the counter or other device monitoring its operation time is reset. The second pump 44 then re-assumes the role of the secondary pump.

The manner in which the first and second relief valves 76, 78 controlled may also increase the reliability of the hydraulic system 32. In particular, when the hydraulic station 30 switches between the pump mode, dual mode, and relief mode, the first and second pumps 42, 44 are not started with the corresponding relief valve closed, as this has potential to damage the pumps. The method described above incorporates this feature. Nevertheless, the control system may also incorporate this safety feature by monitoring feedback from motors of the first and second pumps 42, 44, and only closing the first and second relief valves 76, 78 if the operation of the corresponding pump has been verified based on this feedback.

The embodiments described above are merely examples of the invention defined by the claims that appear below. Those skilled in the design of hydraulic systems will appreciate additional examples, modifications, and advantages based on the description. For example, although FIG. 3 illustrates the first and second relief valves 76, 78 as being 4/2 solenoid valves, other valves capable of carrying out the above-described method may be used. Accordingly, departures may be made from the details of this disclosure without departing from the scope or spirit of the general inventive concept.

The invention claimed is:

1. A method of controlling pressure in a hydraulic system of a wind turbine, the hydraulic system including a hydraulic station with a tank for storing working fluid, first and second pumps fluidly connected to the tank, first and second flow paths extending from the respective first and second pumps to a hydraulic circuit, and first and second relief valves in fluid communication with the respective first and second flow paths, the method comprising:
   controlling the first pump and first relief valve based on maintaining pressure of the working fluid in the hydraulic circuit between a first minimum limit and first maximum limit;
   controlling the second pump and second relief valve in addition to the first pump and first relief valve if the pressure of the working fluid in the hydraulic circuit falls below the first minimum limit;
   verifying that the first or second pumps operate when the first or second pumps are requested to do so by a control system; and
   closing the first or second relief valves only if the operation of the respective first or second pumps has been verified.

2. The method according to claim 1, wherein controlling the first pump and first relief valve comprises:
   operating the first pump while the first relief valve is closed to build pressure in the hydraulic circuit;
   stopping the first pump from operating and opening the first relief valve if the pressure increases to the first maximum pressure; and
   operating the first pump and closing the first relief valve if the pressure falls to the first minimum pressure limit.

3. The method according to claim 1, wherein controlling the second pump and second relief valve in addition to the first pump and first relief valve further comprises:
   operating the first and second pumps while the first and second relief valves are closed to build pressure in the hydraulic circuit;
   opening the second relief valve if the pressure increases to a second maximum limit, the second maximum limit being less than the first maximum limit; and
   opening the first relief valve if the pressure increases to the first maximum limit.

4. The method according to claim 3, wherein controlling the second pump and second relief valve in addition to the first pump and first relief valve further comprises:
   closing the first and second relief valves if the pressure falls to a second minimum limit thereby allowing the first and second pumps to re-build pressure in the hydraulic circuit, the second minimum limit being less than the first minimum limit.

5. The method according to claim 3, wherein operating the first and second pumps further comprises:
   operating the first pump if the pressure of the working fluid in the hydraulic circuit falls to the first minimum limit; and
   operating the second pump in addition to the first pump only if the pressure remains at or below the first minimum limit after a predetermined time period.

6. The method according to claim 1, further comprising:
   reversing the roles of the first and second pumps and first and second relief valves, such that the second pump and second relief valve are controlled based on maintaining pressure of the working fluid in the hydraulic circuit between the first minimum limit and first maximum limit, and further such that the first pump and first relief valve are controlled in addition to the second pump and second relief valve if the pressure of the working fluid falls below the first minimum limit.

7. The method according to claim 6, further comprising:
   replacing the first pump after reversing the roles of the first and second pumps and first and second relief valves.

8. A method of controlling pressure in a hydraulic system of a wind turbine, the hydraulic system including a hydraulic station with a tank for storing working fluid, first and second pumps fluidly connected to the tank, first and second flow paths extending from the respective first and second pumps to a hydraulic circuit, and first and second relief valves in fluid communication with the respective first and second flow paths, the method comprising:
   controlling the first pump and first relief valve based on maintaining pressure of the working fluid in the hydraulic circuit between a first minimum limit and first maximum limit;
   controlling the second pump and second relief valve in addition to the first pump and first relief valve if the pressure of the working fluid in the hydraulic circuit falls below the first minimum limit; and
   reversing the roles of the first and second pumps and first and second relief valves, such that the second pump and second relief valve are controlled based on maintaining pressure of the working fluid in the hydraulic circuit between the first minimum limit and first maximum limit, and further such that the first pump and first relief valve are controlled in addition to the second pump and second relief valve if the pressure of the working fluid falls below the first minimum limit,
   wherein reversing the roles of the first and second pumps and first and second relief valves further comprises:
   monitoring the amount of time the first pump is operated before the roles are reversed; and
   reversing the roles after the cumulative operation time of the first pump exceeds a predetermined time limit.

9. The method according to claim 8, further comprising:
   monitoring the amount of time the secondary pump is operated; and
   after reversing the roles of the first and second pumps and first and second relief valves, switching the first and second pumps and first and second relief valves back to initial roles when the cumulative operation time of the secondary pump exceeds a predetermined time limit.

10. A method of operating a wind turbine, comprising:
   operating a subsystem of a hydraulic system, the subsystem requiring working fluid to operate;
   supplying working fluid to the subsystem with a hydraulic station in the hydraulic system, the hydraulic station having a tank for storing working fluid, first and second pumps fluidly connected to the tank, first and second flow paths extending from the respective first and second pumps to a hydraulic circuit of the subsystem, and first and second relief valves in fluid communication with the respective first and second flow paths; and controlling pressure in the hydraulic system by:
controlling the first pump and first relief valve based on maintaining pressure of the working fluid in the hydraulic circuit between a first minimum limit and first maximum limit;
controlling the second pump and second relief valve in addition to the first pump and first relief valve if the pressure of the working fluid in the hydraulic circuit falls below the first minimum limit; and
reversing the roles of the first and second pumps and first and second relief valves, such that the second pump and second relief valve are controlled based on maintaining pressure of the working fluid in the hydraulic circuit between the first minimum limit and first maximum limit, and further such that the first pump and first relief valve are controlled in addition to the second pump and second relief valve if the pressure of the working fluid falls below the first minimum limit,
wherein reversing the roles of the first and second pumps and first and second relief valves further comprises:
monitoring the amount of time the first pump is operated before the roles are reversed; and
reversing the roles after the cumulative operation time of the first pump exceeds a predetermined time limit.

11. The method according to claim 10, further comprising:
filtering the working fluid in an offline filter system of the hydraulic station, the offline filter system being isolated from the first and second pumps, first and second flow paths, and hydraulic circuit of the subsystem.

* * * * *